United States Patent [19]

Shaw et al.

[11] Patent Number: 4,643,940
[45] Date of Patent: Feb. 17, 1987

[54] LOW DENSITY FIBER-REINFORCED PLASTIC COMPOSITES

[75] Inventors: Ken M. Shaw, Baton Rouge, La.; Ritchie A. Wessling, Midland, Mich.; Larry D. Yats, Clare, Mich.; Selim Yalvac, Midland, Mich.

[73] Assignee: The Dow Chemical Company, Midland, Mich.

[21] Appl. No.: 638,163

[22] Filed: Aug. 6, 1984

[51] Int. Cl.$^4$ .................. B32B 27/04; B32B 27/14
[52] U.S. Cl. .................. 428/308.4; 428/323; 428/325; 428/336; 428/910
[58] Field of Search .......... 428/325, 308.4, 314.4, 428/315.5, 315.7, 315.9, 910, 323, 336

[56] References Cited

U.S. PATENT DOCUMENTS

| | | | |
|---|---|---|---|
| 3,515,625 | 6/1970 | Sedlak et al. | 428/314.4 |
| 3,621,092 | 11/1971 | Hofer | 264/322 |
| 3,707,434 | 12/1972 | Stayner | 428/325 |
| 4,015,039 | 3/1977 | Segal et al. | 428/325 |
| 4,025,686 | 5/1977 | Zion | 428/325 |
| 4,113,908 | 9/1978 | Shinomura | 428/315.7 |
| 4,426,470 | 1/1984 | Wessling et al. | 428/288 |
| 4,481,241 | 11/1984 | Kawashima | 428/325 |

*Primary Examiner*—Paul J. Thibodeau
*Attorney, Agent, or Firm*—G. C. Cohn; D. L. Corneglio; D. R. Howard

[57] ABSTRACT

This invention is a novel high void volume fiber-reinforced resin composite having a continuous matrix of a thermoplastic resin and from about 10 to 50 percent by weight of randomly oriented short reinforcing fibers. A process for making such low density composites is also disclosed.

15 Claims, No Drawings

LOW DENSITY FIBER-REINFORCED PLASTIC COMPOSITES

BACKGROUND OF THE INVENTION

This invention relates to low density, fiber-reinforced plastic composites.

It is known to prepare fiber-reinforced resins using various fibers such as glass, carbon, polyamide and like fibers as reinforcement. The fibers employed in such reinforced resins have ranged in length from very short, as where a ground fiber is used, to very long, as where continuous fiber rovings are used as reinforcement.

The prior art fiber-reinforced resins have generally been nonporous, high density materials; that is, they have not contained substantial amounts of pores or voids within the reinforced resins.

It would be useful for some applications to provide a plastic composite which has a low density yet has the advantage of containing fiber-reinforcing material. For example, it is often desirable to provide a light weight resin sheet having high flexural strength and flexural stiffness. A porous fiber-reinforced plastic composite would be highly desirable for such an application.

It is known that certain fiber-glass reinforced resins will expand or "loft" when heated above the softening temperature of the resin in the absence of compressive forces. For example, resins reinforced with continuous spiral fiber-glass rovings will loft under such conditions, forming an expanded material in which the resins no longer forms a continuous matrix surrounding the fiberglass. The lofting occurs uncontrollably and the resulting product does not have good physical properties. As a result, the lofted material is not useful for making structural articles.

It would therefore be desirable to provide a low density fiber-reinforced plastic composite.

SUMMARY OF THE INVENTION

This invention is such a low density, fiber-reinforced resin composite. The resin composite of this invention comprises a high void volume continuous matrix comprising a thermoplastic resin. Distributed through said matrix is from about 10 to 50 percent by weight of the composite of randomly oriented reinforcing fibers. Said fibers further have an average length from about 0.125 to about 1.0 inch (3-25 mm) and an aspect ratio (length-/diameter ratio) of at least about 40.

In another respect, this invention is a process for preparing a low density, fiber-reinforced resin composite. Said process comprises heating a densified fiber-reinforced resin sheet above the softening temperature thereof, whereby the sheet is expanded in the direction perpendicular to the plane defined by said sheet, and then cooling the expanded sheet below the softening temperature thereof to form a low density fiber reinforced resin composite. The resin sheet used as a starting material comprises a continuous matrix comprising a thermoplastic resin. Distributed through said resin is from about 10 to 50 percent by weight of the sheet of reinforcing fibers, wherein said fibers are randomly oriented in two dimensions substantially in the plane defined by said sheet. The fibers have an average length of about 0.125 to 1.0 inches (3-25 mm). Said fibers also have an aspect ratio of at least about 40.

The composite of this invention exhibits an excellent strength-to-weight ratio as well as a very high flexural stiffness as compared to conventional cellular plastics.

In addition, the composite of this invention has a continuous resin matrix which renders it useful in the preparation of shaped articles and, in particular, load-bearing articles.

In addition to its physical properties, the composite of this invention exhibits significant sound and heat insulating properties. As a further advantage, the composite of this invention may be prepared having selected areas of low density (lofted) and high density (unlofted) material. This "selectively lofted" material is especially useful in applications where a generally low density material is desired but stronger or tougher high density regions are needed such as for attaching the part to another component, or for regions of wear and the like.

DETAILED DESCRIPTION OF THE INVENTION

The composite of this invention comprises a continuous high void volume matrix comprising a heat fusible resin. Distributed throughout said matrix are reinforcing fibers which comprise from about 10 to 50, preferably 15 to 40, more preferably 25 to 40 percent by weight of the composite.

By "high void volume" it is meant that the composite has a void volume, i.e. the volume of the composite which is air space, from about 20 to about 90, preferably about 30 to about 70, more preferably about 50 to about 70 percent of the volume of the composite. Such void volumes correspond approximately to an expansion of from about 20 to 500 percent, preferably 50–300 percent, in thickness during the preparation of the composite from a densified sheet as described hereinafter.

Although the density of any composite will depend on the particular resin and fiber employed therein, for a typical composite containing a polyolefin matrix and glass fibers, and density from about 15–65 pounds/cubic foot (0.24–1.04 g/cc), preferably 15–30 pounds/cubic foot (0.24–0.48 g/cc) is generally exhibited.

The heat fusible resin used herein can be any resin which is solid at ambient temperatures and into which the reinforcing fibers can be incorporated.

Due to the preferred method in which the composite is prepared, it is generally preferable that the resin be water-insoluble and capable of being prepared as particles or a suspension of particles such as a polymer emulsion.

Suitable such resins include, for example, polyolefins such as polyethylene, high density polyethylene, linear low density polyethylene, polypropylene and the like; chlorinated polyethylene; polycarbonates; ethylene/acrylic acid copolymers; polyamides such as nylon 6, nylon 6,6 and the like; phenylene oxide resins; phenylene sulfide resins; polyoxymethylenes; polyesters; the so-called ABS (acrylonitrile, butadiene, styrene) resins; polyvinyl chloride; vinylidene chloride/vinyl chloride resins; polyether ether ketones; polysulfones; polyetherimides; and vinyl aromatic resins such as polystyrene, poly(vinylnaphthalene), poly(vinyltoluene) and the like. The foregoing listing is not intended to be exhaustive, and the skilled artisan will readily recognize the utility of other thermoplastic resins in this invention.

Although any of these resins are suitable herein, the particular choice of resin may depend somewhat on the particular requirements of the application for which the composite is to be used. For example, properties such as impact resistance, tensile strength, heat distortion temperature, barrier characteristics and the like are all effected by the choice of polymer. For most applications, however, polyolefins, vinyl aromatic resins and vinylidene chloride/vinyl chloride copolymers are preferred due to their relatively low cost and generally good properties.

As discussed more fully hereinafter, the composite of this invention is advantageously prepared from a densified fiber-reinforced sheet. Since the individual fibers significantly overlap in such sheet, the densification process tends to cause the fibers to bend slightly where they overlap. It is believed, although it is not intended to limit the invention to any theory, that in the lofting process described hereinafter, the bent fibers straighten, aiding in the lofting and expansion of the sheet. For this reason, it is necessary that the flexural modulus of the fiber, under the conditions of the lofting of the sheet, be greater than the modulus of the continuous resin matrix. In general, relatively stiff fibers of low elongation are useful herein.

Suitable such fibers include glass fibers, particularly E-glass and the like, metallized glass fibers, especially aluminized glass fibers, ceramic fibers, graphite fibers, nickel-coated graphite fibers and polyamide fibers, aromatic polymer fibers, polybenzimide, polybenzoxazol, polybenzathiazol, polyester fibers and the like. Of these, glass is generally preferred for most applications due to its excellent reinforcing properties and relatively low cost. Of course, with specialized applications, other fibers may be more suitable. For example, if especially high strength is required, graphite fibers may be preferred. Conductive fibers such as metal, metallized graphite or metallized glass fibers provide the composite with the ability to shield electromagnetic interference or to conduct electricity. Mixtures of the foregoing fibers are, of course, suitable herein.

The fibers employed herein have an average length from about 0.125 to 1.00 inch (3–25 mm), preferably from about 0.18 to 0.5 inches (4–12 mm). Said fibers also have an aspect ratio of (length to diameter ratio) of at least about 40, preferably at least about 100. The reinforcing fibers are essentially uniformly dispersed throughout the resinous matrix and are randomly oriented in the plane defined by the composite, i.e., there is substantially no alignment of the fibers in any particular direction within said plane.

Various optional components are also advantageously employed in the composite of this invention. In the preferred method for making the composite, it is generally necessary to employ a polymeric binder. Accordingly, the resulting composite made using this process generally contains the solids of said polymeric binder. Suitable binders include polymeric latexes of substantially water-insoluble organic polymers having bound anionic or cationic charges, such as acrylic or styrene/butadiene polymers containing bound sulfonium, sulfoxonium, isothiouronium, pyridinium, quaternary ammonium, sulfate, sulfonate or carboxylate groups. Latex binders which are suitable for use in said preferred method are described in greater detail in U.S. Pat. No. 4,426,470, which is hereby incorporated by reference.

In addition, starch, particularly starch which contains linear polymers such as natural starch or corn starch, as well as enzymatically or chemically modified starch including cationic starch, is suitable as a binder in said preferred method and the composite of the invention can contain said starch in the resin matrix.

In addition, said preferred process generally requires the use of a flocculant. Accordingly, the composite of this invention prepared by said process generally further comprises solids of said flocculant. Suitable flocculants include aluminum polychloride (aluminum hydroxychloride) or diverse organic flocculants such as partially hydrolyzed polyacrylamide, modified cationic polyacrylamide, and diallydiethylammonium chloride. Said flocculant is typically present in relatively small amounts (i.e., less than about 5, preferably less than 3 percent by weight of the composite of this invention).

With the use of certain binders, in particular carboxylic acid polymers, distribution of the slurry is widely effected by lowering the pH below the pKa of the acid groups.

A blowing agent is optionally employed in preparing the composite of the invention. Such blowing agents may be an inert gas such as carbon dioxide, argon, neon, nitrogen, oxygen and the like, or a lower boiling hydrocarbon such as various halogenated, particularly fluorinated, hydrocarbons. Alternatively, a chemical blowing agent may be employed. Suitable chemical blowing agents include various carbonates, bicarbonates, nitrates, alkali borohydrides, peroxides, urea, and azo compounds. The use of a blowing agent tends to favor the formation of a closed-cell low density composite. However, it is understood that other variables, such as higher density of the densified sheet and a relatively low fiber content, also favor closed-cell formation.

The composite of this invention may also optionally contain minor amounts of a filler such as silicon dioxide, calcium carbonate, magnesium oxide, cellulosic fibers such as wood pulp, magnesium hydroxide, cacium silicate and mica. Pigments or dyes may also be added to impart opacity and/or color. Various chemical additives such as anti-oxidants, UV stabilizers, thickeners, bacteriocides and the like may also be used.

The low density composite of this invention is advantageously prepared from a densified fiber-reinforced polymer sheet as described in U.S. Pat. No. 4,426,470. Said densified sheet is generally characterized as having a continuous matrix comprising a thermoplastic resin in which are distributed substantially unbroken reinforcing fibers as described hereinbefore. Said fibers are randomly oriented in two dimensions in a plane defined substantially by the densified sheet. By "densified" it is meant that the sheet has a void volume of no greater than about 20 percent of the total volume of the sheet. Such densified sheet is advantageously prepared using a paper-making process followed by densification under pressure as described, for example, in Example 6 of U.S. Pat. No. 4,426,470, or a similar process.

If desired, two or more of such sheets may be laminated together and used to prepare the low density composite of this invention. If a laminated starting material is used it is possible to selectively loft only some of the layer to provide a product having both low density and high density layers.

In the process of this invention, the densified sheet is heated above the softening temperature of the resin matrix, whereby the sheet is expanded in a direction perpendicular to the plane of the sheet, i.e., the thickness of the sheet is increased. Said heating is performed in the absence of pressure which prevents the expansion of the sheet.

Heating can be done using an ordinary forced air oven, or preferably radiation such as in an infrared oven or a microwave radiation oven if the resin or other component of the sheet is sensitive to microwaves. Advantageously, the densified sheet is heated so that the temperature of the resins to be lofted is slightly (for example, from about 5-150° F.) above the temperature of the polymer matrix. Excessive heating causes degradation of the polymer, or renders the viscosity of the densified sheet so low that it loses its physical shape or integrity. Since, during conductive heating, the exterior portion of the sheet is normally at a higher temperature than the interior portion, it is generally necessary to avoid overheating the exterior portion of the densified sheet. It is generally preferred that the surface temperature not be more than about 150° F. greater than the core temperature, and in any event, less than a temperature at which the polymer degrades.

Typically, depending on the particular composition of the densified sheet and the thickness thereof, said lofting occurs within about 10-600, more generally about 30-180 seconds of heating. The time required is generally inversely related to the temperature employed.

The amount of expansion of the sheet can be controlled, if desired, by the use of a mold or by expanding the sheet between two surfaces which define a desired thickness. In the absence of any such mold or surfaces, the sheet generally expands to about 120 to 500 percent, more generally 200-300 of its original thickness. To obtain thinner composites, a mold having a smaller depth or two surfaces defining a smaller thickness is employed. Alternatively, the heating can be controlled so that only the surfaces of the densified sheet loft, or only one side is lofted.

A compositional variance in the densified sheet can also be used to control lofting. Glass content and glass length, for example, affect the amount of lofting which occurs.

Following the expansion or lofting of the sheet material to the desired thickness, the lofted composite is cooled advantageously under slight pressure below the softening point of the resin to form a low density fiber-reinforced resin composite.

Modifications of the foregoing general procedure can be made to produce more specialized products.

The thickness of the low density composite is controllable by the thickness of the resin sheet employed as a starting material. In addition, the thickness of the low density composite is controllable by the manner in which heat is applied to soften the resin sheet. The resin sheet may be heated evenly on both major surfaces causing both said major surfaces to loft. By controlling the heating so that the center of the sheet is not heated above the softening point, an expanded composite is obtained which is lofted on each major surface but retains a center region of material which remains densified. Such a composite is useful, for example, in applications where increased tensile properties are desired.

Similarly, by heating only one major surface of the resin sheet, it is possible to loft only one side thereof while maintaining the opposite side of the sheet in densified form.

In the further modification of the foregoing process, it is possible to provide a low density composite which is selectively lofted, i.e., only desired portions of the resin sheet are expanded. Applicants have found that in the heating and cooling steps of the lofting process, application of relatively low pressure (i.e., 10 to 200 psi (0.7-14 kg/cm$^2$)) to the resin sheet substantially reduces or prevents the lofting of the resin sheet. Accordingly, by continuously applying said pressure to desired portions of the resin sheet during said heating and cooling steps there is obtained a low density composite containing areas of densified or partially densified material. The same effect is achieved by heating only selected areas of the densified sheets. Such areas of densified material are useful, for example, at areas of wear or at points in the low density composite where it is to be fastened to another article, especially by the use of nails, rivets, bolts, screws or the like. The densified area is significantly tougher than the expanded area, thereby affording a stronger, more permanent fastening point. Because the densified areas are provided by maintaining pressure during the heating and cooling steps or by maintaining such areas unheated altogether, the shape of the densified area is readily controlled by applying said pressure to only those portions of the sheet which are to remain densified, or by shielding portions of the sheet which are not to be lofted from the heat.

Generally, the low density composite of this invention has a slightly rough surface due to the presence of the reinforcing fibers at the surfaces of the composite. However, a relatively smooth resin layer which is generally from about 0.05 to 1 mil (0.0013 to 0.025 mm) thick can be formed in the expansion process. Such layers are provided by performing the heating and cooling steps between two surfaces spaced such that the expanded composite completely fills the area between said surfaces. The surfaces are such that the resin spreads, evenly against the surfaces, forming a smooth continuous layer on each surface of the resulting low density composite.

In preparing said low density composite with smooth surface layers, the surfaces between which the resin sheet is expanded are advantageously glass, metal, a polymer material having a significantly higher softening point than the resin sheet, or other surface against which the molten resin will spread and level. Of particular use are halogenated hydrocarbon polymer sheets, especially fluorinated hydrocarbon sheets such as Teflon © sheets. Polyester sheets having a high melting temperature are also useful.

As another variation in the foregoing lofting process, the resin sheet can be molded and lofted in a single operation by first molding the sheet into a desired form in a mold and then, while maintaining the molded resin sheet above it softening temperature, opening the mold to permit the molded resin sheet to expand. The resulting molded low density composite is then cooled below its softening point. In this process, it is preferable to coat the walls of the mold with a conventional mold release agent.

It is possible to further control the lofting of the densified sheet by using a lightly crosslinked polymer such as a crosslinked high density polyethylene in the polymer matrix. Such crosslinking is advantageously introduced by treating the polymer, before or after formation of the sheet, with crosslinking radiation such as electron beam radiation cobalt-60 radiation or by incorporating a latent crosslinking agent into the sheet. Crosslinking tends to decrease the lofting of the densified sheet. Typically, from about 1-10 megarods of radiation introduce sufficient crosslinking to significantly reduce the lofting of the composite, with a greater amount of radiation further reducing the lofting.

The low density composite of this invention exhibits many beneficial properties which render it suitable in diverse applications. These low density composites have excellent strength-to-weight ratios as compared to conventional foamed polymers. The flexural properties of these polymers are especially good. Because of these excellent physical properties, the composite of this invention is useful even in certain load bearing applications where prior art polymer foams are often unsuitable due to their relatively poor strength.

In addition, the low density composite of this invention has been found to exhibit substantial heat insulative properties. Generally, the low density composite of this invention exhibits an R value of about 1.5–3.0 °F-ft² hr/BTU-in. Thus, the low density composite of this invention can be employed as a single component providing both structural and heat insulative functions.

The low density composite of this invention also is excellent in attenuating sound and, therefore, may be used as sound insulation in houses, factories, automobiles, offices and other noisy environments.

Another unique feature of the composite of this invention is that except for smooth surfaced embodiments, when adhered to a substrate by means of an adhesive layer, the bond between said composite and the adhesive layer is surprisingly tenacious. The strength of said bond is much stronger than the corresponding bond between a like adhesive and either the non-reinforced polymer matrix or the reinforcing fibers alone. It is believed that this tenacious bonding is due to the presence of the reinforcing fibers at the surface of the expanded low density composite. The presence of these fibers creates an extremely large surface area to which the adhesive can bond. Because of this tenacious bonding, therefore, the composite of this invention is extremely useful in preparing laminates with many types of materials. Thus, for example, the composite of this invention may be used as a substrate to which a decorative or other functional surface is laminated. Alternatively, a sandwich structure wherein two outer layers of the composite of this invention "sandwich" non-fiber reinforced inner layer is readily prepared.

Due to the many beneficial properties of the composite, it is useful in a wide variety of applications. This composite can be used, for example, as an underlayment for carpet or backing for carpet. Said composite may be formed into various shaped articles in which rigidity and relatively low density are desirable, such as automobile interior trim parts. Said composite is also useful in sheet form as sound insulation as in partitions between office walls, or in the walls of houses or to shield noise from heavy machinery as in a factory. The composite of this invention is also useful as a load bearing and/or thermal insulation panel. Other uses of these composites will be apparent to those skilled in the relevant arts.

The following examples are provided to illustrate the invention but are not intended to limit the scope thereof. All parts and percentages are by weight unless otherwise indicated.

EXAMPLE I

A high density polyethylene mat with a basis weight of 200 lb/3000 ft² filled with 40 percent by weight ⅜ inch (9 mm) glass fibers is prepared according to the general procedure described in Example 1 of U.S. Pat. No.4,426,470. This mat is cut into 12—12×12 inch (305×305 mm) squares, which are stacked and thermowelded together on a continuous double belt laminator of the type described in U.S. Pat. No. 3,148,269, at a pressure of about 300 psi (21 kg/cm²) and a temperature of 205° C. The resulting densified sheet has a thickness of ⅛ inch (3 mm).

The densified sheet is placed in an infrared oven and heated at 185° C. After about 30 seconds, the edges of the sheet begins to expand to about 1.5 times the original thickness. The lofting spreads toward the center of the sheet, until, after about 1–3 minutes, the entire sheet is lofted to about 1.5 times the original thickness. The sheet is then cooled to form a low density composite.

EXAMPLE II

Twenty mil sheets of densified high density polyethylene/glass mat as described in Example 1 are prepared. These sheets are heated in the infrared oven at 175° C. for about 90 seconds. Complete lofting of the sheet is seen. The sheet is then cooled. The lofted composite has a density of less than 0.36 gm/cc and a tensile strength of about 3460 psi (245 kg/cm²). The lofted composite is easily formable with the application of heat and pressure.

EXAMPLE III

Sample Nos. III-1 through III-6 are prepared using the general procedure described in Example I. Sample Nos. III-1 through III-4 have a high density polyethylene matrix and contain approximately 40 percent glass fibers with an average length of about ⅜ inches (9 mm). Sample Nos. III-5 and III-6 have a polypropylene matrix and contain approximately 40 percent glass fibers with an average length of about ½ inch (12 mm). The R value of the samples is measured according to ASTM C-518, wherein the temperature on the hot side of the sample is 100° F., and that of the cold side is 50° F. The results are reported in Table I following.

TABLE I

| | Sample No. | | | | | |
| --- | --- | --- | --- | --- | --- | --- |
| | III-1 | III-2 | III-3 | III-4 | III-5 | III-6 |
| Matrix | HDPE[4] | HDPE | HDPE | HDPE | PP[5] | PP |
| Polymer Glass Content (%) | 40 | 40 | 40 | 40 | 40 | 40 |
| Thickness, in. (mm) | 0.415 (10.5) | 0.384 (9.75) | 0.325 (8.25) | 0.302 (7.67) | 0.377 (9.58) | 0.383 (9.72) |
| Density lb/ft³ (g/cc) | 20.1 (0.323) | 21.7 (0.348) | 28.0 (0.448) | 30.6 (0.490) | 22.7 (0.364) | 21.8 (0.349) |
| R Value[1] °F. · ft² · In BTU | 1.05 | 1.06 | 0.93 | 0.82 | 0.96 | 0.88 |
| R Value inch² °F. · ft² · hr/BTU · in. | 2.53 | 2.76 | 2.86 | 2.72 | 2.55 | 2.30 |
| K Factor[3] BTU · in hr · ft² · °F. | 0.395 | 0.362 | 0.349 | 0.368 | 0.393 | 0.435 |

[1]ASTM C-518
[2]R value ÷ thickness of the composite
[3]Calculated as $K = \frac{1}{R \text{ value/ inch}}$
[4]High density polyethylene
[5]Polypropylene

EXAMPLE IV

To seven liters of water is added with stirring 0.25 g xanthan gum. Then, 23.1 g of ¼ inch (6 mm) chopped glass fibers are added to the water and stirred for 5 minutes to disperse the glass. To this mixture is added with stirring 2 g polyethylene fibers. Then, 40 g HDPE and 4.2 g of Celogen AZ-199 blowing agent (an azo-type blowing agent) is added. To the mixture is added 4.9 g of latex solids (as a 48.2 percent solids latex). The resulting mixture is flocculated by the slow addition of 25 g of a 0.5 percent cationic flocculant solution.

The flocculated slurry is put into a Williams sheet mold containing seven liters of water and dewatered onto a 80 mesh screen. The wet mat is then pressed lightly and dried at 110° C. to remove remaining water.

The mat is compression molded at 145° C. to form a densified composite having a density of about 66 lb/ft³ (1.06 g/cc).

Samples of this sheet are foamed by
(a) putting the sheet in a 225° C. salt bath for 2-4 minutes or
(b) heating in a matched metal dieset to 100° C. The dieset is left open to about twice the thickness of the densified sheet.

Using either process, the expanded composite has a density of about 36 lb/ft³ (0.58 g/cc). Expansion occurs solely in the thickness direction of the sheet.

EXAMPLE V

Using the general process described in U.S. Pat. No. 4,426,470, a polymer mat is prepared having a high density polyethylene matrix (containing 3.5 percent latex binder solids) and about 33 percent 3/16 inch (4.5 mm) glass fibers dispersed therein. The mat is cut into 6 inch square (150 mm×150 mm) sections.

A sufficient number of the square mat sections are cut and stacked to provide approximately 100 g of mat in a positive pressure metal die press. The mats are then molded for 3½ minutes at 180° C. and 208 psi (15 kg/cm²) and then 1½ additional minutes at 180° C. and 694 psi (49 kg/cm²). The molded mats are cooled under pressure for 3 minutes until they were cooled below the softening point of the resin and removed from the mold. The resulting molded sheet is ⅛ inch (3 mm) thick and has a density of 1.21 g/cc. This procedure is repeated to prepare three samples. One of these is designated Sample No. V-A and subjected to physical properties testing as described hereinafter.

The second sample is lofted by heating in a mold at 180° C. for 10 minutes. A shim is placed in the mold to limit the expansion of the sheet to ¼ inch (6 mm) (100 percent expansion). The resulting expanded sheet has a density of 0.64 g/cc. It is designated Sample No. V-B.

The third sample is likewise lofted to a total thickness of ⅜ inch (9 mm) (200 percent expansion) and a density of 0.39 g/cc. This sample is designated Sample No. V-C.

The tensile strength, elongation at break, Young's modulus, maximum flexural strength and notched impact strength of each of Sample Nos. V-A through V-C are determined, with the results reported in Table II following.

TABLE II

| | Sample No. | | |
|---|---|---|---|
| | V-A* | V-B | V-C |
| Thickness, in. | 0.123 | 0.250 | 0.375 |
| Density, g/cc | 1.21 | 0.64 | 0.39 |
| Tensile Strength[1] psi (kg/cm²) | 16,850 (1,190) | 8,942 (630) | 3,832 (270) |
| Elongation at break, %[1] | 3.24 | 3.04 | 4.0 |
| Young's modulus psi[1] (kg/cm²) | 714,000 (50,300) | 249,000 (17,500) | N.D. |
| Notched Impact Strength[2] | 4.4 | 3.1 | 2.2 |
| Maximum Flexural Strength[3] psi (kg/cm²) | 27,689 (1,950) | 9,711 (684) | 4,176 (294) |

*Not an example of this invention
N.D. Not Determined
[1]ASTM D-638
[2]ASTM D-256
[3]ASTM D-790

What is claimed is:

1. A fiber-reinforced composite prepared by an aqueous slurry process and heat expanded in thickness to a void volume of from about 20 to about 90 percent by volume, said composite comprising a continuous matrix comprising a solid thermoplastic resin and, distributed throughout said matrix, from about 10 to 50 percent by weight of the composite of randomly oriented reinforcing fibers wherein said fibers have an average length from about 0.125 to 1.00 inch and an aspect ratio of at least about 40.

2. The composite of claim 1 wherein the fibers comprise glass.

3. The composite of claim 1 wherein said thermoplastic resin comprises polyethylene or polypropylene.

4. The composite of claim 1 wherein said thermoplastic resin comprises a polyvinyl aromatic resin.

5. The composite of claim 1 wherein said continuous matrix further comprises the solids of a polymeric binder.

6. The composite of claim 5 wherein said continuous matrix further comprises the solids of a flocculating agent.

7. The composite of claim 1 wherein said reinforcing fibers comprise from about 20 to 40 percent by weight of the composite.

8. The composite of claim 1 having a void volume from about 30 to 70 percent.

9. The composite of claim 1 wherein said continous fiber reinforced matrix contains at least one shaped low void volume section.

10. The composite of claim 1 or 9 having on each major surface thereof a smooth resin layer from about 0.05 to 1 mil thick.

11. The composite of claim 1 wherein the major portion of voids are open-celled.

12. A fiber-reinforced composite comprising a continuous matrix which comprises a solid the thermoplastic resin and, distributed throughout said matrix, from about 10 to 50 percent by weight of the composite of randomly oriented reinforcing fibers, said fibers having an average length of from about 0.125 to 1.0 inch and an aspect ratio of at least about 40, said matrix having a void volume of from about 20 to about 90 percent by volume and being prepared by heating a densified fiber-reinforced resin sheet to a temperature above the resin's softening temperature, whereby the sheet is expanded in a direction perpendicular to that of a plane defined by said sheet.

13. The composite of claim 12 wherein the temperature to which the densified sheet is heated is less than that at which the resin degrades.

14. The composite of claim 12 wherein the temperature to which the densified sheet is heated is less than that at which viscosity of the resin becomes so low that the densified sheet loses its physical shape or integrity.

15. The composite of claim 12 wherein the expanded sheet is cooled below the softening temperature of the resin.

* * * * *